(12) United States Patent
Oster et al.

(10) Patent No.: US 7,011,225 B2
(45) Date of Patent: Mar. 14, 2006

(54) DEVICE FOR RELEASING AND INTERLOCKING THE COLLAPSIBLE SIDE WALLS OF CASES OR CONTAINERS, ESPECIALLY RETURNABLE CONTAINERS MADE OF PLASTIC MATERIALS

(75) Inventors: Heinz Günter Oster, Starnberg (DE); Christian Barth, Pullach (DE)

(73) Assignee: Schoeller Wavin Systems Services GmbH, Oberhaching (DE)

(*) Notice: Subject to any disclaimer, the term of this patent is extended or adjusted under 35 U.S.C. 154(b) by 109 days.

(21) Appl. No.: 10/338,577

(22) Filed: Jan. 8, 2003

(65) Prior Publication Data

US 2004/0129700 A1 Jul. 8, 2004

(51) Int. Cl.
*B65D 6/18* (2006.01)
(52) U.S. Cl. ......................................................... 220/7
(58) Field of Classification Search .................... 220/6, 220/7
See application file for complete search history.

(56) References Cited

U.S. PATENT DOCUMENTS

| 6,290,081 B1 * | 9/2001 | Merey ............................ 220/7 |
| 2003/0000950 A1 * | 1/2003 | Murakami et al. ............. 220/6 |

FOREIGN PATENT DOCUMENTS

| DE | 4009960 | 10/1990 |
| DE | 9213794 | 1/1993 |
| DE | 29804061 | 6/1998 |

* cited by examiner

Primary Examiner—Stephen Castellano
(74) Attorney, Agent, or Firm—Van Dyke, Gardner, Linn & Burkhart, LLP

(57) ABSTRACT

The invention concerns a device for releasing and interlocking the collapsible side walls of a returnable container by means of a servo element that is provided with locking lugs at both ends and can be released by means of lifting. The side walls of the container can be folded inwards while they are being released.

30 Claims, 3 Drawing Sheets

Figure 3:
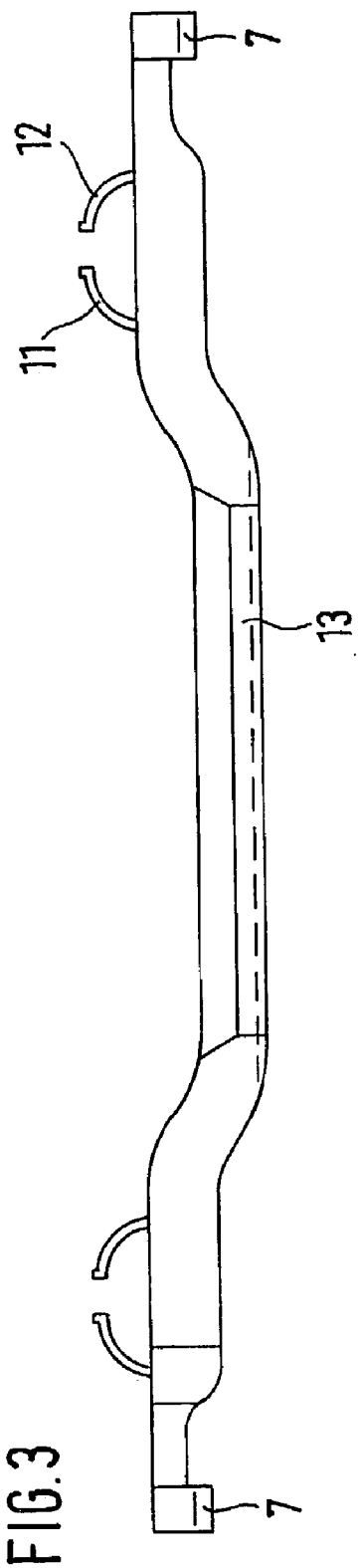

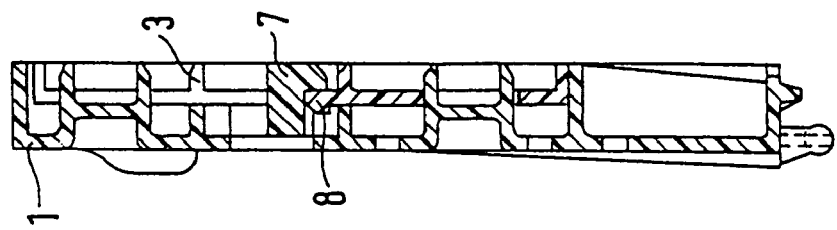
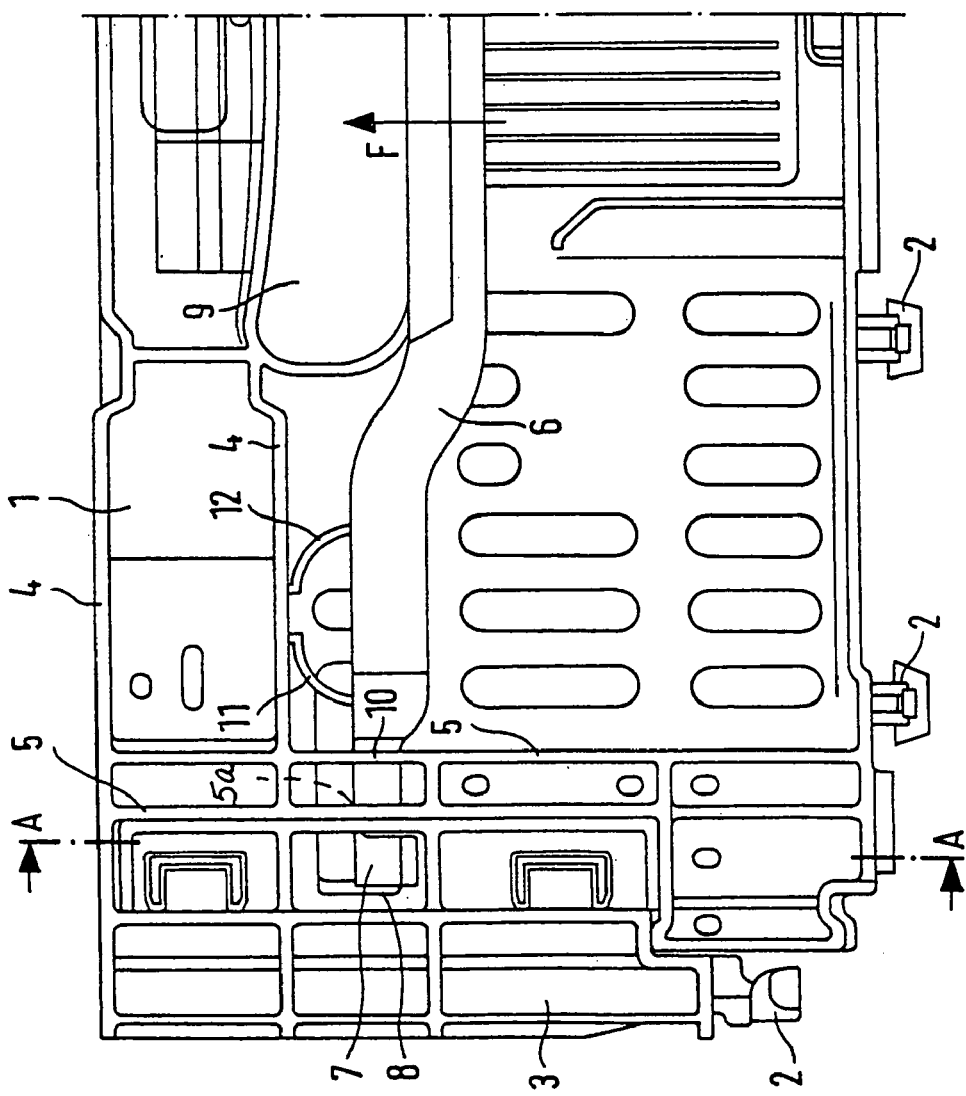

DEVICE FOR RELEASING AND INTERLOCKING THE COLLAPSIBLE SIDE WALLS OF CASES OR CONTAINERS, ESPECIALLY RETURNABLE CONTAINERS MADE OF PLASTIC MATERIALS

The invention concerns a device for releasing and interlocking the collapsible side walls of cases or containers, especially returnable containers made of plastic materials, in particular, containers provided with four side walls that can be folded down onto the container bottom.

Containers and/or cases with four collapsible side walls are known and are extensively employed for the transport of objects both in households and in the storage and transportation industry. A multitude of different types of collapsible cases and/or containers are known, in which the side walls are either attached to the container bottom by means of articulated joints or are formed integrally with the container bottom, the fold line being defined by a kind of film hinge. A feature common to all containers with collapsible side walls is that the collapsible side walls are reversibly interlocked with each other at their upper edge.

To this end locking lugs are often provided or formed on the shorter side walls of the container that engage by means of a snap joint with corresponding locking hooks on the longer side walls when the containers are unfolded for assembly. But the releasing often proves difficult and toilsome, because the locking lugs have to be pressed out of their interlocked position with the locking hooks. The locking lugs and locking hooks are therefore often formed in a flexible manner, even though this can lead to the breakage of the hooks and/or the lugs during the interlocking and releasing operations. With a view to improving the releasing, there have been provided pivotably hinged servo elements in the side walls that bear upon the locking lugs and can be operated by applying pressure with a finger or a hand. When it is desired to release the joint, the servo element is pressed, whereupon the swivelling motion of the servo element deviates the locking lug out of its interlock position with the locking lug, after which the thereby released side wall can be collapsed onto the bottom of the container. Although these solutions are satisfactory, they are still capable of further improvement, especially as far as the handling aspects are concerned.

The invention therefore sets out to create a device for releasing and interlocking the collapsible side walls of returnable containers that has a simple and robust structure and can be operated with ease. In particular, the invention is to assure that when the container is gripped, which is usually done by getting hold of the handling opening or the gripping parts with the hand, the side walls of the case may also be released, if necessary by means of a single movement of the hand. Moreover, the releasing is also to make it possible to fold the side walls of the container inwards with the same move.

According to the invention, this aim is attained by means of the features set out in the characterizing parts of claims 1 and 2, while useful further developments are characterized by the features described in the dependent claims.

Figure 4:
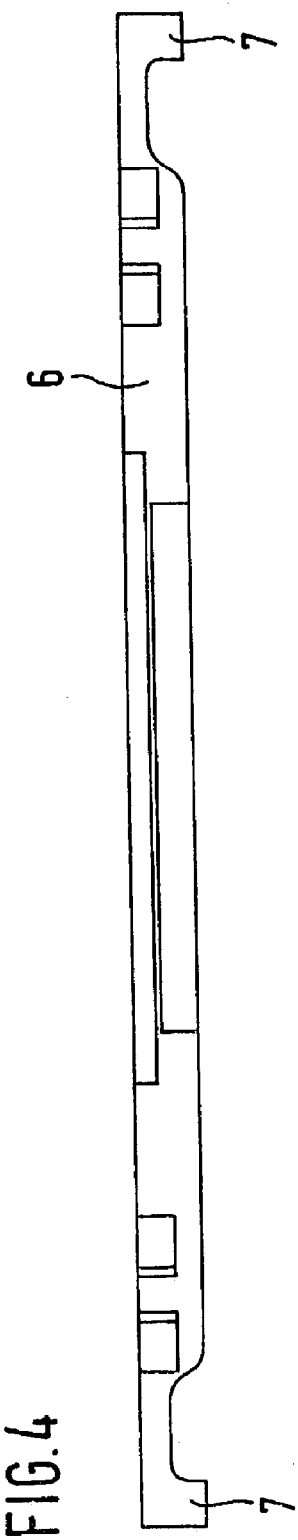
Figure 5:
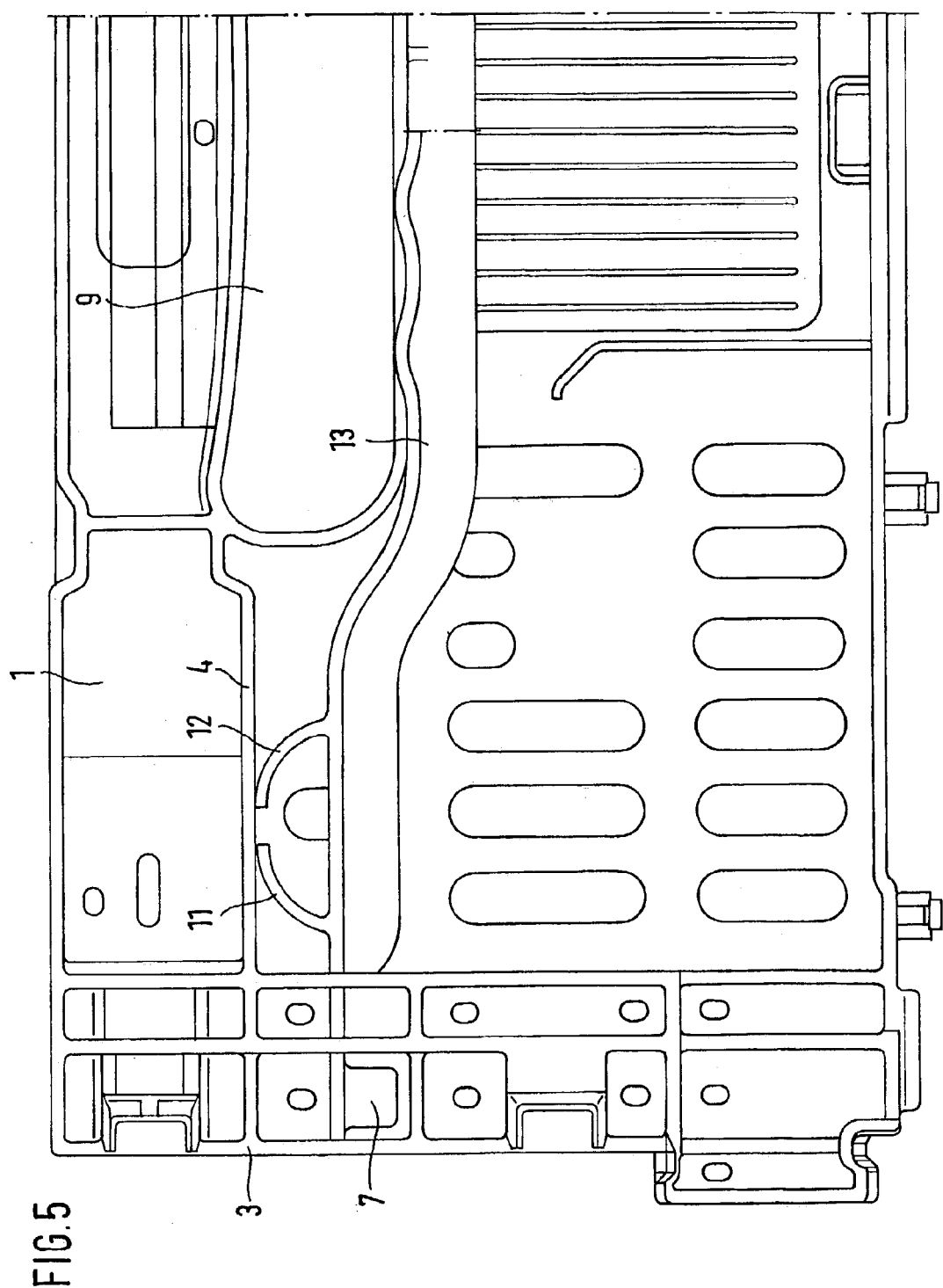

In accordance wit the invention, a servo element is provided on the side wall capable of being folded inwards or a pair of opposite side walls capable of being folded inwards, especially on the outer faces of these walls, said servo element being capable of being displaced upwards by pulling it with the fingers. This upward movement of the servo element causes locking lugs forming part of the element to be lifted out of the position in which they interlock with the locking hooks of the adjacent side walls, so that the side walls released in this manner can then be folded inwards. Advantageously, the servo element with its gripping region will be arranged in the region of the handling opening or other gripping device of the container. The returnable container will naturally be gripped by means of this handling opening or other gripping device. Due to the fact that the servo element forms part of this region, in case of need the servo element can be very effectively gripped with the fingers, pulled upwards and, following the releasing thereby effected, the side wall can immediately be moved inwards. Advantageously, moreover, the servo element will be elastically pre-tensioned, so that a certain pressure will have to be exerted to obtain the releasing. Appropriate in this connection are straps or clips forming part of the servo element that bear against a part of the side wall, especially against an up-stand or a horizontal stiffener rib on the outer face of the side wall. This also assures that the operator will always have a good "feel" of the pressure he exerts on the servo element. When the servo element is released, it will automatically return to its rest position due to the return forces built up by the displaced straps or clips, so that the interlocking can also be achieved in a very simple manner. To this end one has to do no more than to get hold of the side wall by means of the gripping bar and/or the servo element, fold it upwards and then exert a slight pull on the servo element. When the side wall is in its vertical position, the servo element is released, so that the locking lug—due to the return forces acting on the servo element as a result of the elastic pre-tensioning—will automatically become inserted onto the locking hooks, so that the side wall will become locked in position. Furthermore, the device is structured in an extremely simple and robust manner and there is no need for instruction as to how the side walls have to be interlocked and released, because this is done automatically when the appropriately equipped servo element is gripped and pulled upwards A number of embodiments will now be described with the help of the drawing, in which:

FIG. 1 shows a partial view of the shorter side wall of a returnable container in accordance with the invention in its working position, in which this side wall is interlocked with the longer side wall, FIG. 1A shows an enlarged, partial fragmentary view of a portion of the side wall of FIG. 1, FIG. 2 shows a section view along the line A—A of FIG. 1, FIG. 3 shows a side elevation of the servo element in accordance with the invention, FIG. 4 shows a view from above of the servo or actuation element shown in FIG. 3, and FIG. 5 shows a partial view similar to FIG. 1, but of another embodiment of the invention.

In FIG. 1 the reference number 1 designates a part of the shorter side wall of the returnable container, which is made up of a total of four side walls that can all be folded down onto the container bottom (not shown in the figure). In the figure the side wall 1 is seen from the outside, so that the side wall 1 can be folded down into the plane of the drawing. The reference number 2 designates the hinges formed at the bottom of the shorter side wall 1, which in this case are pinned hinges. By means of these hinges 2 the side wall 1 is pinned to the appropriately equipped container floor. On the left hand side the reference number 3 designates the longer side wall with which the side wall 1 can be interlocked, as will be described in greater detail further on. The side wall 3 is likewise provided with appropriate hinges 2 that serve to pin it into the appropriate half of the hinge on the container bottom. It can be seen that the hinges 2 of the longer side wall 3 are arranged somewhat higher than the hinges 2 of the shorter side wall 1. The reason for this is that the longer side walls 3 have to be folded down onto the previously folded shorter side walls 1 that rest on the container bottom. But this arrangement and the design of the pinned hinges are already state of the art, so that there is no need to discuss them in greater detail here.

A servo element, indicated by the reference number 6 and designed as a bar shaped somewhat in the manner of a coat hanger, is arranged on the outer face of side wall 1, which is provided with projecting stiffener ribs 4 in the horizontal direction and projecting stiffener ribs 5 in the vertical direction. This bar or servo element, which essentially extends over the entire length of the shorter side wall 1 (though only its left half is shown in the figure), has its ends accommodated and held in appropriate recesses of the vertical stiffening ribs 5 and is preferably guided therein also in the direction of the arrow F, i.e. the direction in which it is moved. At both its free ends the servo element 6 is provided with locking lugs 7, which—though shown in FIG. 1—can best be seen in FIG. 2 (section view). In the interlocked position illustrated by FIGS. 1 and 2, the locking lug 7 engages with a locking hook 8 of the longer side wall 3, so that the shorter side wall 1 is thereby interlocked with both the longer side walls 3. Such a locking device is of course provided on both sides, but for the sake of simplicity only the left half of side wall 1 is shown in FIG. 1.

As can best be seen from FIG. 1, the central region of the servo element 6 is aligned with or arranged along the lower edge of the customary handling (or gripping) opening 9 of the shorter side wall 1. Lastly, as already explained earlier on, the servo element 6, which has its left-hand end guided in a recess 5a in the vertical stiffener ribs 5 (situated at 10), is resiliently pre-tensioned, for which purpose on each side of the servo element of the illustrated embodiment there are provided two are-shaped spring clips 11 and 12 that face each other. These spring clips 11 and 12 have their upper ends bear against the horizontal stiffener rib 4 arranged immediately above them on the outer face of the side wall.

When the shorter side wall 1 has to be released and therefore folded down, the servo element 6 is gripped with the fingers in the region of the handling opening and lifted upward, so that the locking lugs 7 will likewise be lifted upward with respect to the locking hooks 8, whereupon the very move of gripping and lifting the servo element will also make it possible for the released shorter side wall 1 to be folded inwards. Whenever necessary, the mechanism may also be reversed, so that the release (. . . of the side walls. . . ) will be obtained by means of a vertical downward motion of the servo element 6.

FIG. 3 shows the servo element on its own and permits one to see rather clearly that the central part 13 where it has to be gripped constitutes a downward bulge with respect to its two ends.

In the embodiment illustrated by FIG. 5 the servo element 6 is provided with a wavy surface in the region of the handling opening 9 in the shorter side wall 1, so that it matches the fingers of a hand and is therefore ergonomically designed. Of course, it is also possible for the gripping part 13 to be given some other shape, for example, appropriate recesses can be provided in the servo element to match the fingers of a human hand. In any case, whenever this is desired, gripping and lifting of the central part 13 will automatically release the shorter side wall 1 from the two longer side walls. When the servo element is lifted, the spring clips 11 and 12 will be pressed against the horizontal stiffener rib 4 and become pre-tensioned, so that a return force is built up. When the servo element 13 is released, the servo element 13 will be pressed downwards by the pre-tensioned spring clips 11 and 12 and, with the side wall 1 in the vertical position, will thus of its own accord arrive in the position in which the side wall is released from the longer side walls 3.

Other designs are, of course, possible. Depending on the width of side wall 1, the servo element 13 may also be subdivided into two servo elements, in which case one servo element will operate on the left-hand side and the other on the right-hand side. It is also possible for the servo element to be arranged in a different position with respect to the handling opening 9, possibly somewhat further below the lower edge of the handling opening 9 or even above it, in which case the gripping part 13 may also be arranged in the region of some other gripping element on the side wall, a gripping batten for example. In any case, it will be advantageous if the gripping part 13 is arranged in the region of the lower edge of the handling opening 9 as in the illustrated embodiment. When the container is to be released and folded, all that has to be done is to reach further downward with one or two fingers, or also with the entire hand, to lift the servo element 13, after which the released side wall 1 can be folded inwards without having to change the position of the hand.

The invention claimed is:

1. A device for releasing and locking collapsible side walls of a container, said device comprising:
    an actuator in combination with collapsible side walls that can be folded down onto a container bottom, wherein at least one side wall of said side walls can be releasably interlocked with two opposite side walls of the other side walls, said one side wall having an outer face and a handling opening extending therethrough, and said handling opening having a lower edge; and
    said actuator comprising an elongate member with a medial portion defining a grip member and with end portions defining a pair of locking lugs, said elongate member including a downward bulge with respect to said portions, said actuator being arranged on said outer face of said one side wall, said grip member located at or below said lower edge of said handle opening, said locking lugs engaging said opposite side walls when in an interlocked position to thereby lock said one side wall to said two opposite side walls, an upward lifting movement of said grip member displacing said locking lugs in an upward direction in such a manner that said one side wall becomes released from said two opposite side walls and can be folded inwards.

2. A device in accordance with claim 1, wherein said actuator is elastically pre-tensioned into the interlocked position.

3. A device in accordance with claim 1, further comprising a second side wall, a second actuator being provided on said second side wall for releasably engaging said two opposite side walls to interlock said second side wall with said two opposite side walls.

4. A device in accordance with claim 1, wherein said locking lugs are formed at free ends of said elongate member.

5. A device in accordance with claim 1, wherein said actuator extends over the length of said one side wall.

6. A device in accordance with claim 5, wherein said locking lugs are formed at free ends of said elongate member.

7. A device in accordance with claim 1, wherein said elongate member is arranged on an outer face of the said one side wall.

8. A device in accordance with claim 1, wherein said grip member is arranged in a central region or said elongate member.

9. A device in accordance with claim 1, wherein said grip member is below said lower edge of the handling opening at least when in said interlocked position.

10. A device in accordance with claim 1, wherein said actuator is elastically pre-tensioned in said interlocked position by two pre-tensioning devices.

11. A device in accordance with claim 10, wherein said pre-tensioning devices comprise arc-shaped spring clips that bear against a part of said one side wall.

12. A device in accordance with claim 1, wherein said one side wall includes vertical stiffener ribs on an outer face of said one side wall, at least one rib of said ribs having a recess, said actuator held in said recess of said at least one rib.

13. A device in accordance with claim 1, wherein said grip member includes a wavy portion defining hollows for fingers.

14. A device in accordance with claim 1, wherein said elongate member comprises a unitary member.

15. A device in accordance with claim 1, wherein said elongate member is bar-shaped.

16. A device in accordance with claim 1, wherein each of said two opposite side walls includes a hook, said locking lugs engaging said hooks to thereby interlock with said two opposite side walls.

17. A device in accordance with claim 4, wherein said actuator extends over the length of said one side wall.

18. A device in accordance with claim 1, wherein said one side wall is shorter than said two opposite side walls.

19. A device in accordance with claim 10, wherein said one side wall includes an outer face, said actuator mounted to said outer race.

20. A device in accordance with claim 19, wherein said outer face side includes ribs.

21. A device in accordance with claim 20, wherein said pre-tensioning devices comprise spring-like clips, said clips bearing against said ribs to thereby pre-tension said actuator in said interlocked position.

22. A device in accordance with claim 20, wherein said actuator is supported by said ribs.

23. A device in accordance with claim 22, wherein a portion of said actuator supported in said ribs is closer to an upper rim of said one side wall than said grip member.

24. A device in accordance with claim 22, wherein each of said ribs supporting said actuator includes a recess, said actuator being supported in said recesses.

25. A device in accordance with claim 22, wherein each of said two opposite side walls has a hook, said locking lugs engaging said hooks when in said interlocked position.

26. A device in accordance with claim 25, wherein said pre-tension devices comprise spring-like clips.

27. A device in accordance with claim 26, wherein said spring-like clips bear against a part of said one side wall.

28. A device in accordance with claim 27, wherein said spring-like clips bear against ribs of said one side wall.

29. A device in accordance with claim 28, wherein said spring-like clips bear against ribs of said one side wall provided on opposed sides of said handling opening.

30. A device in accordance with claim 29, wherein said ribs on opposed sides of said handling opening are located above said lower edge of said handling opening.

* * * * *

UNITED STATES PATENT AND TRADEMARK OFFICE
CERTIFICATE OF CORRECTION

PATENT NO.       : 7,011,225 B2                                    Page 1 of 1
APPLICATION NO.  : 10/338577
DATED            : March 14, 2006
INVENTOR(S)      : Oster et al.

It is certified that error appears in the above-identified patent and that said Letters Patent is hereby corrected as shown below:

Column 2
Line 17, "up-stand" should be --upstand--

Column 3
Line 35, delete "5a" after "recess"
Line 38, "are-shaped" should be --arc-shaped--

Column 5
Claim 8, Line 5, "or" should be --of--

Column 6
Claim 19, Line 3, "race" should be --face--

Signed and Sealed this

Twenty-sixth Day of August, 2008

JON W. DUDAS
*Director of the United States Patent and Trademark Office*